United States Patent [19]
Tarczy-Hornoch

[11] 3,911,368
[45] Oct. 7, 1975

[54] PHASE INTERPOLATING APPARATUS AND METHOD

[76] Inventor: Zoltan Tarczy-Hornoch, 7106 Marlborough Terrace, Berkely, Calif. 94705

[22] Filed: June 20, 1974

[21] Appl. No.: 481,066

[52] U.S. Cl. ................ 328/155; 307/208; 307/262; 307/293

[51] Int. Cl.$^{2}$ ......................................... H03K 5/159

[58] Field of Search .................... 307/208, 262, 293; 328/155

*Primary Examiner*—John Kominski

[57] ABSTRACT

Apparatus and method is provided by means of phase interpolation for measuring and generating time intervals with greater accuracy than that provided by the frequency of the clock utilized. A multiple phase delayed and multiple regenerated scheme is used for phase interpolation, and application of the principle for delay generation and time interval measurement is shown.

9 Claims, 2 Drawing Figures

PHASE INTERPOLATING APPARATUS AND METHOD

BACKGROUND OF THE INVENTION

Interpolating time interval measuring schemes to increase resolution beyond the clock frequency are well known in the state of the art, for example U.S. Pat. No. 3,444,462 or Hewlett Packard 5360A Computing Counter.

These methods are usually costly, depend on analog calibration of frequency, current or other quantity, and require considerable processing time after the termination of the measured time interval.

For delay generation a phase locked clock signal to an arbitrarily timed start signal is required. U.S. Pat. No. 3,319,181 discloses such a clock source and U.S. Pat. No. 3,444,462 discloses the use of another such clock oscillator. Both of these clock sources are relatively complex and subject to analog drifts.

Therefore there is a need for an improved phase interpolating apparatus and method which is simple, fast, has high resolution, does not require periodic recalibration and can be used for both time interval measuring and delay generation.

Copending application Ser. No. 427,459 discloses a similar principle used for pulse synchronizing.

SUMMARY OF THE INVENTION AND OBJECTS

The disclosed apparatus and method uses commercially available integrated circuits to achieve subnanosecond time and phase resolution, which is with prior art methods beyond the resolution capability of said integrated circuits.

For delay generation a multiphase clock is utilized and a multiplicity of flip-flops (FF) are used to select the closest phase of the clock to an arbitrarily timed start pulse. The ambiguity of the FF's due to possible marginal triggering is eliminated by multiple reclocking. The closest phase of the clock is used as a phase locked clock for digital delay generation.

For time interval measurement a single phase clock is used in the preferred embodiment, and a time pulse, representing the time interval by its length, is delayed by a multiplicity of delay lines to generate a multiphase relationship to the clock. Again a multiplicity of FF's are used to select and memorize the closest phase relationship between the clock and the leading and trailing edges of the multiple-delayed time pulse. The full time interval is the sum of the full clock periods plus the fractional phase interpolated start and stop periods between the leading and trailing edges of the time pulse. For elimination of FF ambiguity again reclocking is utilized.

In general, it is the object of the present invention to provide an improved phase interpolating apparatus and method.

Another object of the invention is to utilize the phase interpolating apparatus to provide an improved phase locked clock generator.

Another object of the invention is to utilize the phase locked clock generator to provide an improved digital delay generator.

Another object of the invention is to utilize the phase interpolating apparatus to provide an improved digital time interval measuring apparatus.

Another object of the invention is to provide phase interpolating, delay generating and time interval measuring apparatuses which do not require analog adjustments.

Another object of the invention is to provide phase interpolating, delay generating and time interval measuring apparatuses which can utilize commercially available integrated cicuits for high resolution and which are simple, fast and low in cost.

Additional objects and features of the invention will appear from the following description in which the preferred embodiment is set forth in conjunction with the accompanying drawings.

DESCRIPTION OF THE PREFERRED EMBODIMENT

Figure 1:
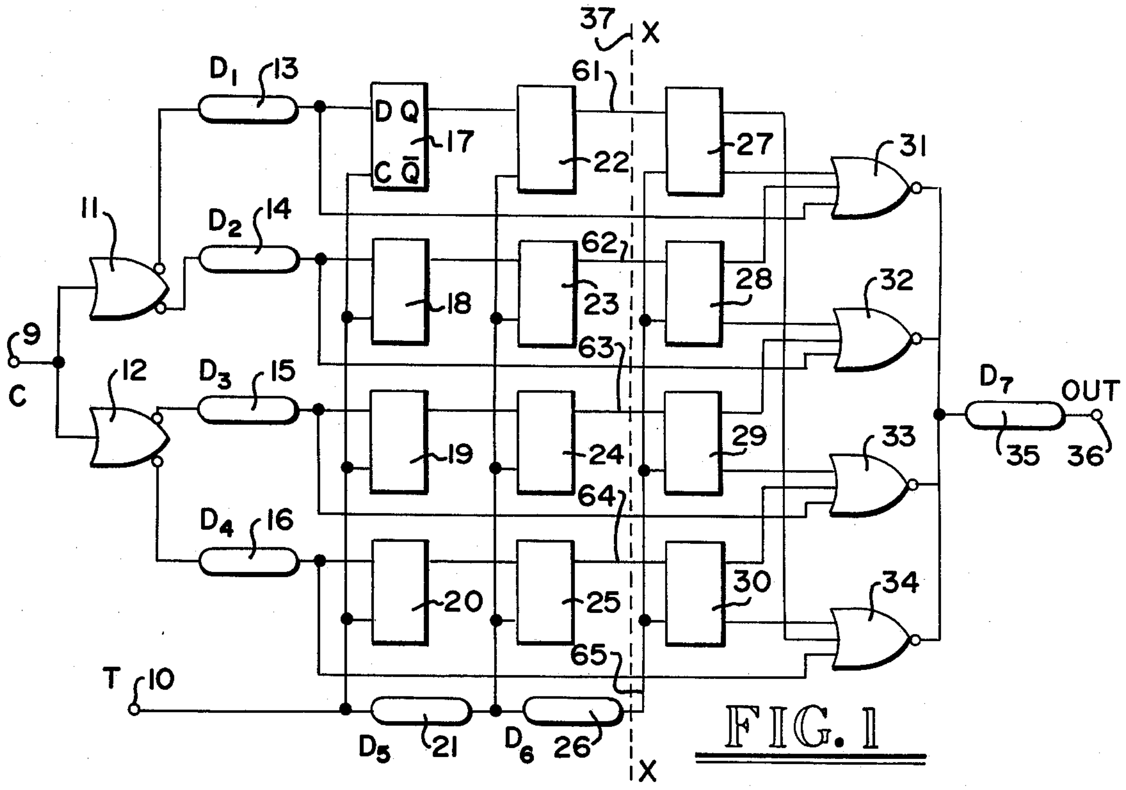
FIG. 1 is a logic diagram showing a preferred embodiment of the invention, on the left side the phase interpolating apparatus and on the right side a phase locked clock signal generator.

On the logic diagram of FIG. 1 elements 9–26 on the left side of dashed line 37 marked x—x form a phase interpolating apparatus.

Terminal 9 marked C receives a series of preferably 50% duty cycle clock pulses coming from a suitable clock generator for example at a rate of 125 MHz, having a period of 8 nsec. Gates 11 and 12 are used as buffer stages (Motorola MC 10111 can be utilized) driving delay lines 13–16, also marked D1 to D4 respectively. The number and values of the delays are selected to uniformly interpolate the period of the clock, for example 0, 2, 4, 6 nsec or 2, 4, 6, 8, nsec for D1 to D4 respectively. The outputs of the delay lines form a multiphase, in the example a four phase, clock. These clock signals are fed into the D inputs of a multiplicity of FF's (e.g. MC 10231) marked 17–20, as many as the number of delay lines. With minor changes JK FF's can also be used. Inputs and outputs are marked on FF 17 only, but all FF's are oriented the same way. The clock inputs of the FF's are connected to terminal 10 also marked T. At any desired T time a pulse is fed to terminal 10 and the clock inputs of the FF's. This will cause some of the FF's to trigger (set) depending on the phase relationship between the multiphase clock and the pulse at time T. For example FF 17 will be set, FF's 19 and 20 will not be, and FF 18 may be triggered marginally, that is the T pulse may come at the trailing edge of the clock pulse so, that it will take a long time for FF 18 to stabilize in either stable state. This phenomenon is known to those skilled in the art, and is referred to as "teetering" in copending application Ser. No. 427,459. To lessen the probability of this ambiguity, a reclocking scheme is used: the outputs of FF's 17–20 are fed into the D inputs of FF's 22—25 together with a delayed (e.g. by 10 nsec) T pulse through D5 into the clock inputs. FF's 22–25 will repeat the state of FF's 17–20, except the probability of "teetering" will be greatly reduced with each regeneration. This reclocking can be repeated as many times as necessary. The measured probability of "teetering" on the MC 10231 is once in a billion after two reclocking.

FF's 27–30 together with delay 26 can be considered another reclocking state on FIG. 1. Outputs of FF's 22–25 or 27–30 therefore clearly and without ambiguity will memorize in their set pattern the relative phase between the clock and the pulse at time T, therefore the left side of FIG. 1 can be called a phase interpolator. If the relative phase between the clock and time T varies, at every 2 nsec (in the example) a new FF pattern will be memorized.

On the right side of line 37 it is shown how the phase interpolator can be utilized to form a phase locked clock generator. As said earlier, FF's 27–30 and delay 26 can be considered as another reclocking stage, even if designated as part of the phase locked clock generator. Q and $\overline{Q}$ outputs of these FF's in pairs are fed into gates 31–34 (e.g. MC 1660) together with the multiphase clock signals at outputs of delays 13–16. Table I shows the principal FF patterns.

Table I

| Relative Phase | FF-s 27 | 28 | 29 | 30 |
|---|---|---|---|---|
| 1 | 1 | 0 | 0 | 1 |
| 2 | 1 | 1 | 0 | 0 |
| 3 | 0 | 1 | 1 | 0 |
| 4 | 0 | 0 | 1 | 1 |

Other patterns may also appear, instead of two set FF's only one or three may be set consecutively.

It will be seen by those skilled in the art, that only one of gates 31–34 will be enabled at any one time (depending on the phase of time T) and at the output of this gate one phase of the multiphase clock will appear. Gate outputs 31–34 are joined to form an implied OR function, and the signal is fed through D7 delay (35) to output terminal 36. By appropriate selection of D7 the output will be a clock signal phase locked to time T within ± 1 nsec in the example. By using a faster clock signal at C and more delay lines, FF's and gates, a phase locked clock signal with ±0.1 nsec or better can be generated.

It will be apparent, that such a clock can be advantageously used for digital delay generation. A counting circuit can be utilized to count the phase locked clock periods, and an output pulse can be generated a selectable N count later. Without a phase locked clock there would be a full clock period uncertainty in the generated delay, with the phase locked clock shown, this uncertainty can be reduced to any desired small value.

Figure 2:
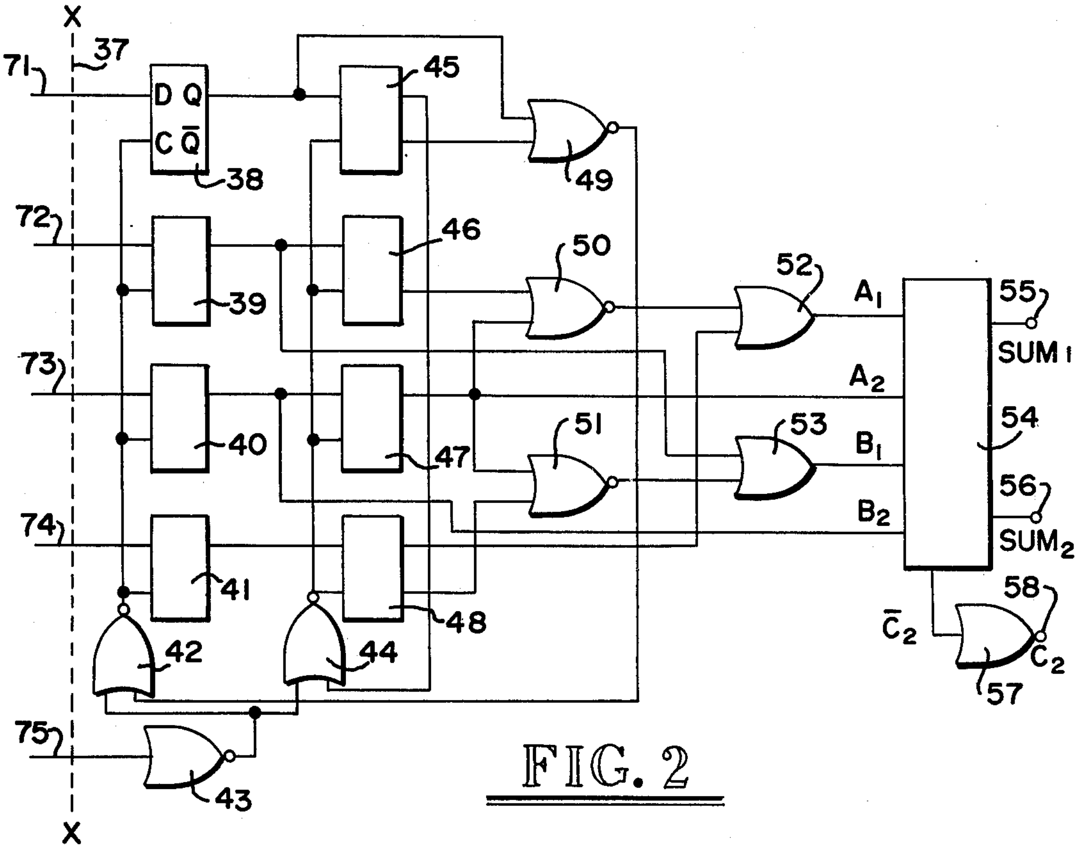
FIG. 2 is a partial logic diagram which can be utilized in conjunction with the phase interpolating apparatus of FIG. 1 for digital time interval measurement.

FIG. 2 shows how the phase interpolator can be used for time interval measurement. Dashed line 37 marked x—x on FIG. 2 corresponds to the same marking on FIG. 1. Lines 61–65 are to be connected to lines 71–75 respectively. There should be a difference in the input. Terminal C is to receive a time pulse with its length indicating the time interval to be measured, terminal T (10) is to be connected to the reference clock generator. Values of D5 and D6 should be preferably zero or the clock period. FF's 45–48 and 38–41 can be considered two more stages of reclocking, but these FF's have another purpose: storing the relative phase positions of the leading and trailing edges of the time pulse respectively. Inputs and outputs are marked on FF 38 only, but all FF's are oriented the same way. Clock signal is supplied to the FF's via gates 43, 42 and 44.

When the propagating leading edge of a time pulse reaches FF's 45–48, Table II shows the possible resulting patterns. It can be seen, that at least FF 45 will be set. Q output of 45 therefore is fed to gate 44, disabling all further clock pulses and thereby freezing the pattern in FF's 45–48. Similarly Table III shows all possible trailing edge patterns in FF's 38–41. At least FF 38 will be reset, therefore 45 set and 38 reset will be a necessary and sufficient condition to indicate a trailing edge. Gate 49 recognizes this AND condition and disables gate 42, thereby freezing the trailing edge patterns in FF's 38–41.

Table II

| Relative Phase | FF-s 45 | 46 | 47 | 48 | Binary Weight 2 | 1 |
|---|---|---|---|---|---|---|
| 1 | 1 | 0 | 0 | 0 | 0 | 0 |
| 2 | 1 | 1 | 0 | 0 | 0 | 1 |
| 3 | 1 | 1 | 1 | 0 | 1 | 0 |
| 4 | 1 | 1 | 1 | 1 | 1 | 1 |
| | | | | | A2 | A1 |

Table III

| Relayive Phase | Weight 38 | 39 | 40 | 41 | Binary 2 | 1 |
|---|---|---|---|---|---|---|
| 1 | 0 | 1 | 1 | 1 | 1 | 1 |
| 2 | 0 | 0 | 1 | 1 | 1 | 0 |
| 3 | 0 | 0 | 0 | 1 | 0 | 1 |
| 4 | 0 | 0 | 0 | 0 | 0 | 0 |
| | | | | | B2 | B1 |

Tables II and III also show how the patterns can be converted to binary code. Gates 50–53 are implementing this conversion. Binary signals A1, A2, B1, and B2 are fed into two bit full adder 54. Sum 1 and Sum 2 (55, 56) outputs are supplying the two least significant bits of the result and gate 57 is providing the carry pulse at terminal 58. All FF's on FIG. 2 for example could be MC 10231, all NOR gates MC 1662, Both OR gates MC 1664 and the adder MC 1059.

The time interval measuring apparatus shown can measure short time intervals with leading and trailing edges falling in subsequent clock periods. It will be evident to those skilled in the art, that for longer time intervals the number of full clock periods should also be counted and than added to the interpolated leading edge plus trailing edge figures. For example if outputs of gates 49 and 43 together with $\overline{Q}$ output of FF 45 are fed into an AND gate, the output will provide the clock pulses between leading and trailing edges and can be counted. The carry pulse, if any, at 58 should be added to this count.

Higher rate clocks and more than four phase interpolators together with faster FF's and gates can achieve 0.1 nsec or better time resolution.

It is apparent from the foregoing, that a new and improved phase interpolating apparatus and method also useful for delay generation and time interval measurement has been provided. Other objects and features of the invention herein before set forth also have been met.

Although the invention has been described with respect to preferred embodiments, it will be appreciated that various changes and modifications may be made therein without departing from the scope of the invention.

What is claimed is:

1. In an interpolation apparatus at least first N and second N bistable circuit means, where N is an integer greater than one, means connecting one input each of said first N bistable circuit means to a first input terminal to receive a first signal therefrom, another input of said first N bistable circuit means connected each to an output terminal of N delay elements of differing length, wherein one delay element may represent zero delay, means connecting the input terminals of said N delay elements to a second input terminal to receive a second signal therefrom, means connecting one output terminal each of said first N bistable circuit means to one input terminal each of said second bistable circuit means, and means connecting another input each of said second N bistable circuit means to receive a replica of said first signal, said second N bistable circuit means thereby serving to trigger with lessened probability marginally if any of said first N bistable circuit means is marginally triggered.

2. Apparatus as in claim 1 together with means connecting one of said first and second input terminal to a source of periodic clock signals.

3. Apparatus as in claim 2 together with

N gating means each having at least two inputs, and means connecting at least one input of each of said gating means to sources of different phases of said periodic clock signal in such manner, that output of one of said gating means will be a periodic clock signal with its phase representing the phase relationship between said first and second signals.

4. Apparatus as in claim 3 together with counting means, serving to generate pulses selectably delayed from one of said first and second signals.

5. Apparatus as in claim 2 together with memory means, adding means and counting means to form an interpolating time interval measuring apparatus.

6. In a method of interpolation the step of generating N signals from a first signal by delaying said first signal by N differing amounts, wherein N is an integer greater than one, the step of feeding said N signals to first N flip-flops, the step of also feeding a second signal to said first N flip-flops, the step of feeding the outputs of said first N flip-flops to second N flip-flops, and the step of also feeding a replica of said second signal to said second N flip-flops, therby causing the second N flip-flops to trigger less marginally, if any of said first N flip-flops is marginally triggered.

7. Method as in claim 6 together with the step of making one of said first and second signals periodic and the other one a reference time pulse.

8. Method as in claim 7 together with the step of selecting by use of gating a phase of said periodic signal substantially in phase with the leading edge of said reference time pulse.

9. Method as in claim 7 together with memorizing the fractional period intervals between the edges of said time pulse and selected phase of said periodic signal, counting the number of full periods of said periodic signal during the time pulse, and summing the numbers representing said fractional perid intervals plus the number of said full periods.

* * * * *